United States Patent [19]
Hoeber et al.

[11] Patent Number: 5,157,768
[45] Date of Patent: Oct. 20, 1992

[54] METHOD AND APPARATUS FOR DISPLAYING CONTEXT SENSITIVE HELP INFORMATION ON A DISPLAY

[75] Inventors: Anthony Hoeber, Woodside; Alan Mandler, San Francisco, both of Calif.; Norman Cox, Irving, Tex.; Timothy Shea, Charlestown; Rick Levine, Waltham, both of Mass.

[73] Assignee: Sun Microsystems, Inc., Mountain View, Calif.

[21] Appl. No.: 703,036

[22] Filed: May 17, 1991

Related U.S. Application Data

[63] Continuation of Ser. No. 323,669, Mar. 15, 1989, abandoned.

[51] Int. Cl.$^5$ .............................................. G06F 15/46
[52] U.S. Cl. ...................................... 395/157; 395/155; 395/156; 340/706
[58] Field of Search ................. 364/518, 521, 522; 340/747, 750, 706; 395/155, 156, 157

[56] References Cited

U.S. PATENT DOCUMENTS

| Re. 32,632 | 3/1988 | Atkinson | 340/709 |
|---|---|---|---|
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,748,618 | 5/1988 | Brown et al. | 370/94 |
| 4,785,408 | 11/1988 | Britton et al. | 364/513 |
| 4,789,962 | 12/1988 | Berry et al. | 364/900 |
| 4,812,834 | 3/1989 | Wells | 340/721 |
| 4,847,604 | 7/1989 | Doyle | 340/706 |
| 4,862,385 | 8/1989 | Fujita et al. | 364/518 |
| 4,864,517 | 9/1989 | Maine et al. | 364/521 |
| 4,879,666 | 11/1989 | Kembo | 364/519 |
| 4,884,223 | 11/1989 | Ingle et al. | 364/550 |
| 4,899,136 | 2/1990 | Beard et al. | 340/706 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |

OTHER PUBLICATIONS

Alexander, "Visualizing Cleared-Off Desktops", *Computer World*, May 6, 1991, p. 20.

*Primary Examiner*—Gary V. Harkcom
*Assistant Examiner*—Phu K. Nguyen
*Attorney, Agent, or Firm*—Blakely, Sokoloff, Taylor & Zafman

[57] ABSTRACT

A central processing unit (CPU) is coupled to a display for displaying graphic and other data. The CPU is further coupled to a cursor control device which permits a user to selectively position a cursor at a desired location on the display, and signal the CPU of selections. Images are generated in the form of "windows" by the CPU which include standard window features as well as text, icons, and buttons which correspond to functions to be executed by the CPU. The selection of certain buttons results in the generation and display of a menu which includes a plurality of functions which may be chosen by a user. Help information may be obtained by a user by positioning the cursor on the display using the cursor control device over an area of the window which the user desires the help information. After placing the cursor over a desired area, which may include by way of example an icon, window function, or other window image, the user depresses a predefined help key on a keyboard coupled to the CPU. The CPU then locates a help description which corresponds to the object or area over which the cursor has been placed. The CPU displays the appropriate help description within a help window.

6 Claims, 4 Drawing Sheets

METHOD AND APPARATUS FOR DISPLAYING CONTEXT SENSITIVE HELP INFORMATION ON A DISPLAY

This is a continuation of application Ser. No. 07/323,669 filed Mar. 15, 1989, now abandoned.

BACKGROUND OF THE INVENTION

The present invention is related to U.S. patent application Ser. No. 07/619,665, filed Nov. 28, 1990, entitled "Method and Apparatus for Selecting Button Functions and Retaining Selected Options on a Display", and hereby refers to, and incorporates by reference the contents of the above-referenced application.

1. Field of the Invention

The present invention relates to apparatus and methods for displaying and manipulating graphic information, and more particularly, the present invention relates to a computer controlled display system for displaying help information based on the positioning of an on-screen cursor over a displayed image.

2. Art Background

It is common for current generation computer display systems to utilize multiple "windows" displayed on a cathode ray tube (CRT) display in which combinations of text and graphics are disposed to convey information to a user. The windows may take the form of a variety of objects such as a file folder, loose-leaf binder, or simple rectangle, and the windows may overlap one another with the "top" window fully visible constituting the current work file. These so-called "object oriented" display systems utilize various icons which symbolically indicate the type of operation the computer system will execute if the icon function is chosen. Frequently, these icons are disposed within a window on the display. The user may delete information from the window, move data from one window to another, and generally operate on the window as if an actual file in an office is being manipulated. Numerous object oriented systems exist today and are displayed on computers manufactured by the assignee, Sun Microsystems, Inc., as well as other manufacturers.

In the event a user requires help in determining what command is appropriate to achieve the desired computer function, or what a particular icon or "desktop" function represents, many systems refer the user to printed manuals for reference. Another attempt to assist the user in an object oriented computer system is the use of a "Help" command or key. Upon encountering difficulty, the user in such systems may press a predefined key to access a help function. The help function simply displays one or more screens of various commonly used commands, or describes the various functions available, in the computer display system. Generally, a help screen in prior art systems is simply a synopsis of the description of the command normally found in a written manual accompanying the computer system. The help display is typically stored on disk or in the memory of the computer system.

Another effort to make computer display systems more personal and self contained is found in the "Star User Interface: An Overview", Smith, et al., National Computer Conference, 1982. The Xerox 8010 Star information system introduced in April of 1981 incorporated a Help key on the computer keyboard. A user depressing the Help button on the Star system was shown a screen displaying the Help table of contents. The Star further included a context dependent invocation of the help function in which the command menu in every window contained a "?" command. By invoking the "?" command, the Star system displayed that part of the help documentation describing the window, its commands and its functions. Other "?" commands appeared in various message areas of the screen; such that invoking these "?" help commands resulted in the display of a description of the method which was related to the particular help command chosen. For example, a help command disposed adjacent to a window would result in a help message describing what a window comprised in the Star system. In other words, selecting a "?" on the display resulted in the display of the associated help documentation relating to the particular help icon "?" chosen.

As will be described, the present invention provides apparatus and methods to permit a user to invoke a help function on a computer display system. The help message displayed by the present invention is context sensitive based on the position of the cursor on the screen. The cursor, in turn, is controlled through the use of a cursor control device operated by a user. Accordingly, by simply placing or pointing the cursor at a particular object or area on the screen and depressing a help key, a help window is displayed which describes the particular object or area which the cursor has been placed over.

SUMMARY OF THE INVENTION

An apparatus and method is disclosed which has application for use in computer controlled display systems, and in particular, display systems having object oriented graphic interfaces. A central processing unit (CPU) is provided and is coupled to a display for displaying graphic and other data. The CPU is further coupled to a cursor control device which permits a user to selectively position a cursor at a desired location on the display, and signal the CPU of selections in accordance with the teachings of the present invention. Images are generated in the form of "windows" by the CPU which include standard window features as well as text, icons, and buttons which correspond to functions to be executed by the CPU. The selection of certain buttons results in the generation and display of a menu which includes a plurality of functions which may be chosen by a user. Help information may be obtained by positioning the cursor on the display using the cursor control device over an area of the window which the user desires the help information. After placing the cursor over a desired area, which may include by way of example an icon, window function, or other window image, the user depresses a predefined help key on a keyboard coupled to the CPU. The CPU locates a help description which corresponds to the object or area over which the cursor has been placed. The CPU displays the appropriate help description within a help window. The help window further includes a magnifying glass icon within which is displayed a copy of the object or area over which the cursor has been placed. The image displayed within the magnifying glass icon corresponds to the help information displayed in the textural portion of the help window. The help window further includes a window mark, such that the placement of the cursor over the window mark, and the momentary depression and release of a switch on the cursor control device, results in the CPU dismissing the help window such that it is no longer displayed.

NOTATION AND NOMENCLATURE

Figure 1:
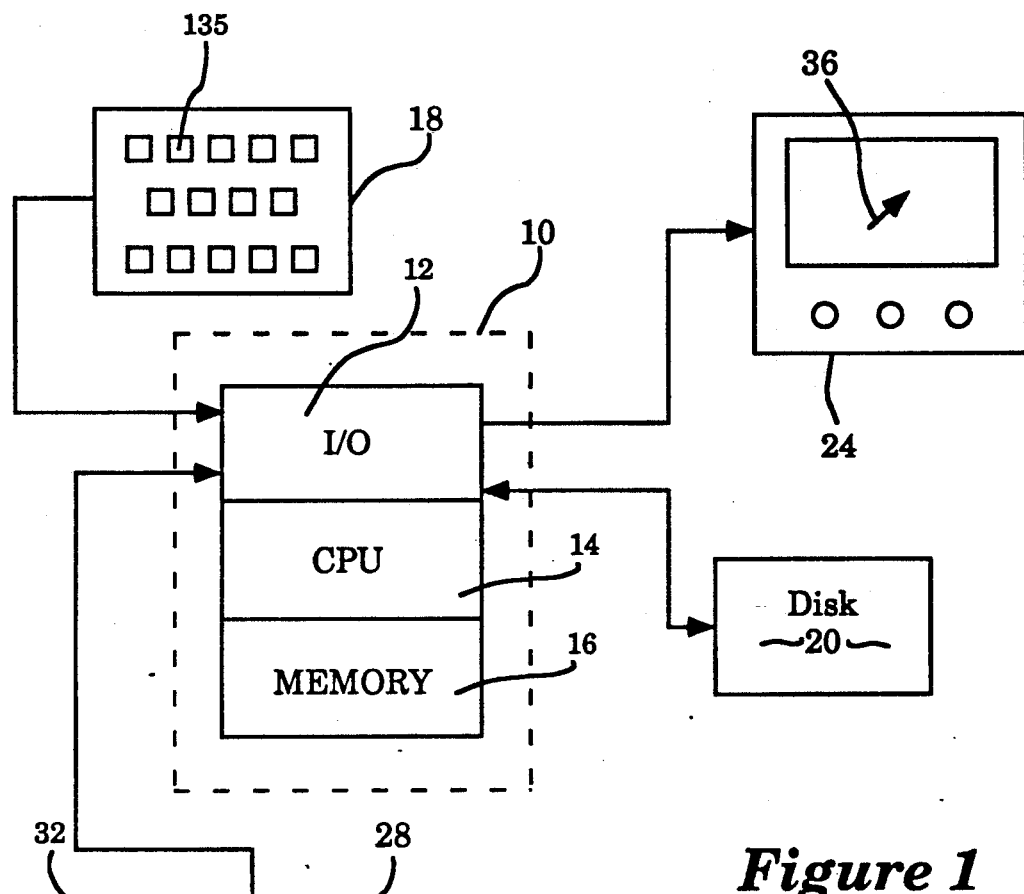
FIG. 1 illustrates a computer incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signal as bits, values, elements, symbols, characters, images, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in the operations described herein which form part of the present invention. In the present case, the operations are machine operations performed in conjunction with a human operator. Useful machines for performing the operations of the present invention include general purpose digital computers or other similar devices. In all cases there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTION

The present invention discloses apparatus and methods for displaying help information pertaining to an image on a computer display. In the following description, numerous specific details are set forth such as computer display system elements, display formats, sample data, etc. in order to provide a thorough understanding of the present invention. However, it will be apparent to one skilled in the art that the present invention may be practiced without these specific details. In other instances, well known circuits and structures are not described in detail in order not to obscure the present invention unnecessarily.

FIG. 1 illustrates a computer based system for generating graphic images in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be representative of a broad category of data processing devices. Also shown in FIG. 1 is a keyboard 18 to input data and commands into computer 10, as is well known. A magnetic disk 20 is shown coupled to I/O circuit 12 to provide additional storage capability for the computer 10. It will be appreciated that additional devices may be coupled to computer 10 for storing data such as magnetic tape drives, bubble memory devices, as well as networks which are in turn coupled to other data processing systems. As is well known, disk 20 may store other computer programs, characters, routines, etc., which may be accessed and executed by CPU 14. A raster display monitor 24 is shown coupled to the I/O circuit 12 and is used to display images generated by CPU 14 in accordance with the present invention. Any well known variety of cathode ray tube (CRT) display may be utilized as display 24. A cursor control device 28 is also shown coupled to computer 10 through I/O circuit 12. Cursor control device 28 includes switches 30, 32 and 34 for signalling CPU 14 in accordance with the teachings of the present invention. Cursor control device 28 (commonly known as a "mouse") permits a user to select various command modes, modify graphic data, and input other data utilizing switches 30, 32 and 34. More particularly, cursor control device 28 permits a user to selectively position a cursor 36 at any desired location on display 24 by movement of the cursor control device 28 over a surface 40. In the presently preferred embodiment, cursor control 28 utilizes a well known optical method for signalling CPU 14 of positional changes of cursor 36 by movement of cursor control over a grid disposed on surface 40. However, it will be appreciated that a variety of well known cursor control devices may be utilized by the present invention, including other cursor control devices such as mechanical mice, track balls, joy sticks, etc.

Figure 2:
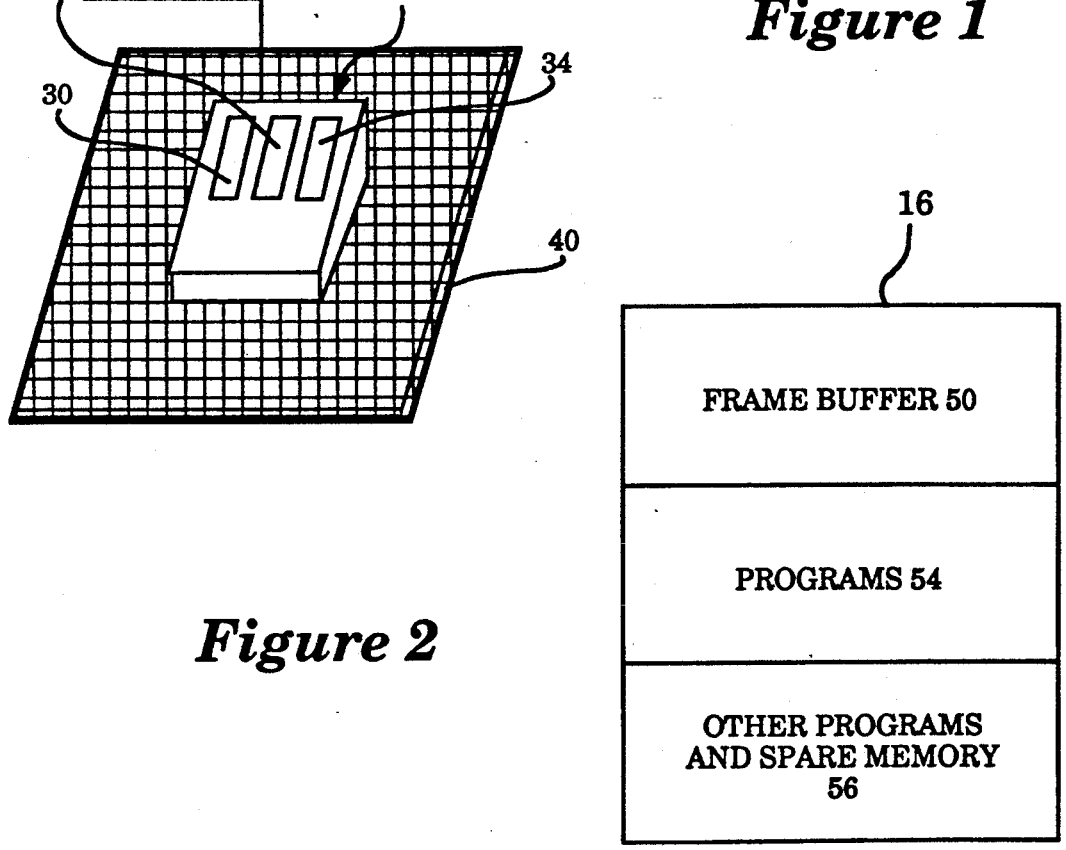
FIG. 2 shows one arrangement of program storage for the system of FIG. 1.

FIG. 2 shows one arrangement of major programs contained within the memory 16 illustrated in FIG. 1. In particular, there is shown a frame buffer 50, which comprises a bit map of display 24. The frame buffer 50 represents the video memory for the display 24, wherein, each storage location in the frame buffer 50 corresponds to a pixel on the display 24. Thus, the frame buffer comprises a two dimensional array of points having known coordinates corresponding to the pixels on the raster display. In its simplest form, frame buffer 50 comprises a contiguous block of memory which is allocated such that each memory location is mapped onto the corresponding pixel on the rastor display 24. Memory 16 also includes a variety of other programs 54 for execution by the CPU 14. For example, a variety of control, display, and calculating programs implementing the operations and routines described in this Specification may be stored in memory 16, as well as monitor control programs and disk operating systems. Moreover, memory 16 further includes space for other programs and spare memory 56 which may be used for a variety of other well known functions and operations in data processing systems.

Figure 3:
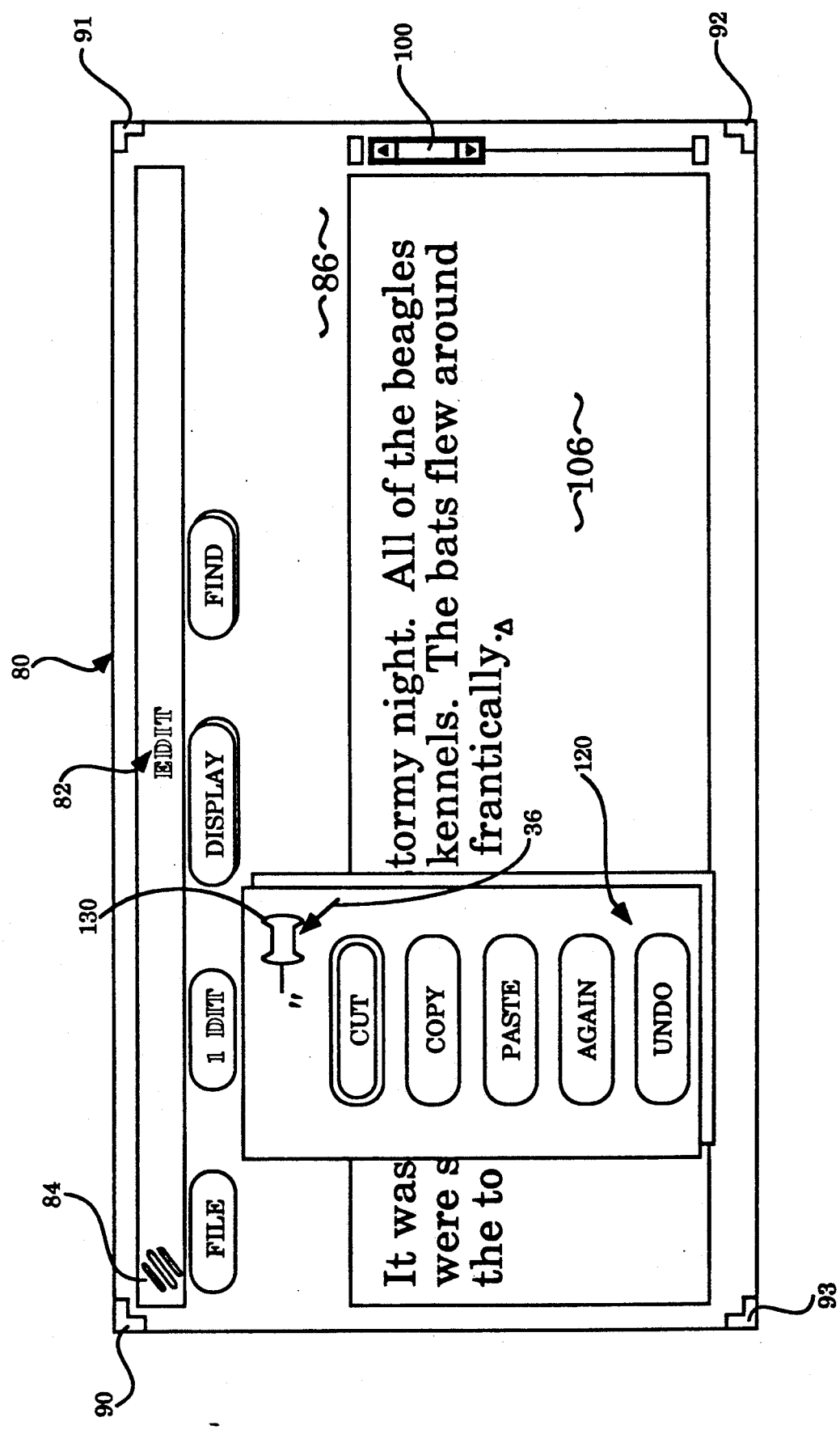
FIG. 3 illustrates the selection of an icon prior to invocation of the help function.

Referring now to FIG. 3, in the presently preferred embodiment, a variety of "windows" may be displayed on display 24. As shown in FIG. 3, a representative window includes a variety of data within the bounded window, in the form of graphics, text and symbols. For example, in FIG. 3 there is shown a representative window identified generally by the numeral 80, which is in the form of a rectangular area on display 24. In the example of FIG. 3, window 80 includes a window title 82 (in the present example "edit") and a window mark 84 which is displayed at the left side of the header in the window. By placing cursor 36 on the window mark 84, and momentarily activating cursor control switch 30, the window is "dismissed" and closed. Once closed, the window 80 is no longer displayed on display 24. A control area 86 is provided for the display of button functions, which will be described in more detail below. Window 80 further includes resize corners 90 through 93 which are used to shrink or expand the borders of window 80, thereby changing the area of the window without changing the relative size of the controls, fonts, icons, etc. displayed within window 80. CPU 14 further displays the image of a vertical scroll bar 100, as shown, which permits text, graphics and the like within the working area 106 of window 80 to be scrolled in the direction in which the scroll bar is "pulled". The scroll bar, in the presently preferred embodiment may be moved by placing cursor 36 over the arrows [see FIG. 3] of the scroll bar and activating a selected switch on cursor control device 28, or alternatively, by placing the cursor 36 on the scroll bar, depressing a preselected switch on cursor control 28, and moving the cursor control device in the direction in which the text or the like within the working area 106 is to be scrolled. Although not shown, window 80 may also incorporate the use of a horizontal scroll bar to selectively scroll horizontally through the text, graphics, etc. disposed within the working area 106.

As shown in FIG. 3, a plurality of button functions may be disposed within window 80. Although the button functions (in the present example entitled: "file", "edit", "display", and "find") are illustrated in area 86, the button control functions may be displayed in other control areas as well as on menus, as will be described below. Although illustrated horizontally, button functions may also be arrayed vertically within the window, and button function names may be in the form of text and/or graphics. In the presently preferred embodiment, button functions may take the form of a single button function or button stacks. A single button function is used for a single command to be executed by CPU 14 (for example "copy"), wherein a button stack is used to group commands together in logical sets on a menu which is displayed when the particular button stack is chosen by a user. Typically, the label on the button stack is the title of the group of commands on the menu and submenus, and not one of the commands (for example, "edit").

Appropriate programming of computer 10 is provided such that a plurality of button stacks and/or buttons are displayed within window 80. In the example of FIG. 3, window 80 includes four button stacks, identified as "edit", "file", "display" and "find". The placement of cursor 36, over the "edit" button stack of FIG. 3 by a user utilizing cursor control device 28, and the activation of a switch (for example, switch 34) on the cursor control device 28 by a user, results in computer 10 generating and displaying a menu 120 below the corresponding button stack (in the present example, "edit") as illustrated. As shown, menu 120 includes a plurality of single button functions which correspond to executable functions by CPU 14. In the present example, buttons disposed within menu 120 include such functions as "cut", "copy", "paste", "again" and "undo", which may be chosen by a user utilizing cursor control device 28. The selection of any of these button functions by a user results in the immediate execution of the function by CPU 14.

As previously discussed, a user may desire information related to a particular object, area, or function within window 80 in order to assist the user in operating the computer display system. In the present invention, the user places cursor 36 over an area of window 80 for which the user desires help information. In the example of FIG. 3 (and the sequence of steps illustreded in FIG. 4), the user has placed cursor 36 over a push pin icon 130 (see U.S. patent application, Ser. No. 07/323,774, filed Mar. 15, 1989, now abandoned for a description related to push pin 130). Upon placing cursor 36 over push pin icon 130, the user depresses a predefined help key on keyboard 18 to invoke the help function. The depression of the help key 135 on keyboard 18 results in the generation and display of a help window. Upon the depression of key 135, CPU 14 examines that portion of the window 80 which is at the location of cursor 36. In the present example, CPU 14 determines that the push pin 130 is below cursor 36. The CPU then utilitzes a lookup table within memory 16 to locate the appropriate help description relating to the push pin 130. CPU 14 retrieves the appropriate help information relating to the object/image over which cursor 36 has been placed, and generates a help window.

Figure 4:
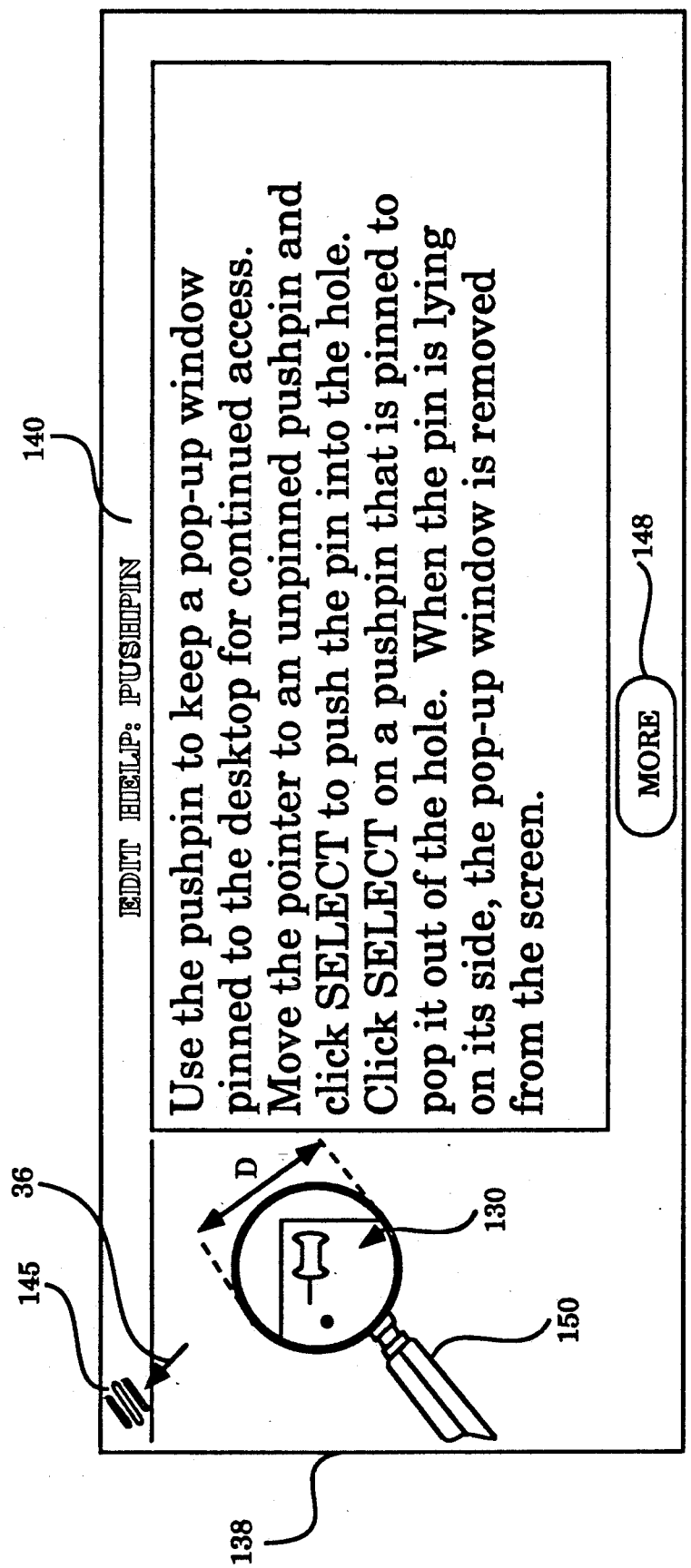
FIG. 4 illustrates a help window which is context dependent based upon the location of the cursor on the display screen.
Figure 5:
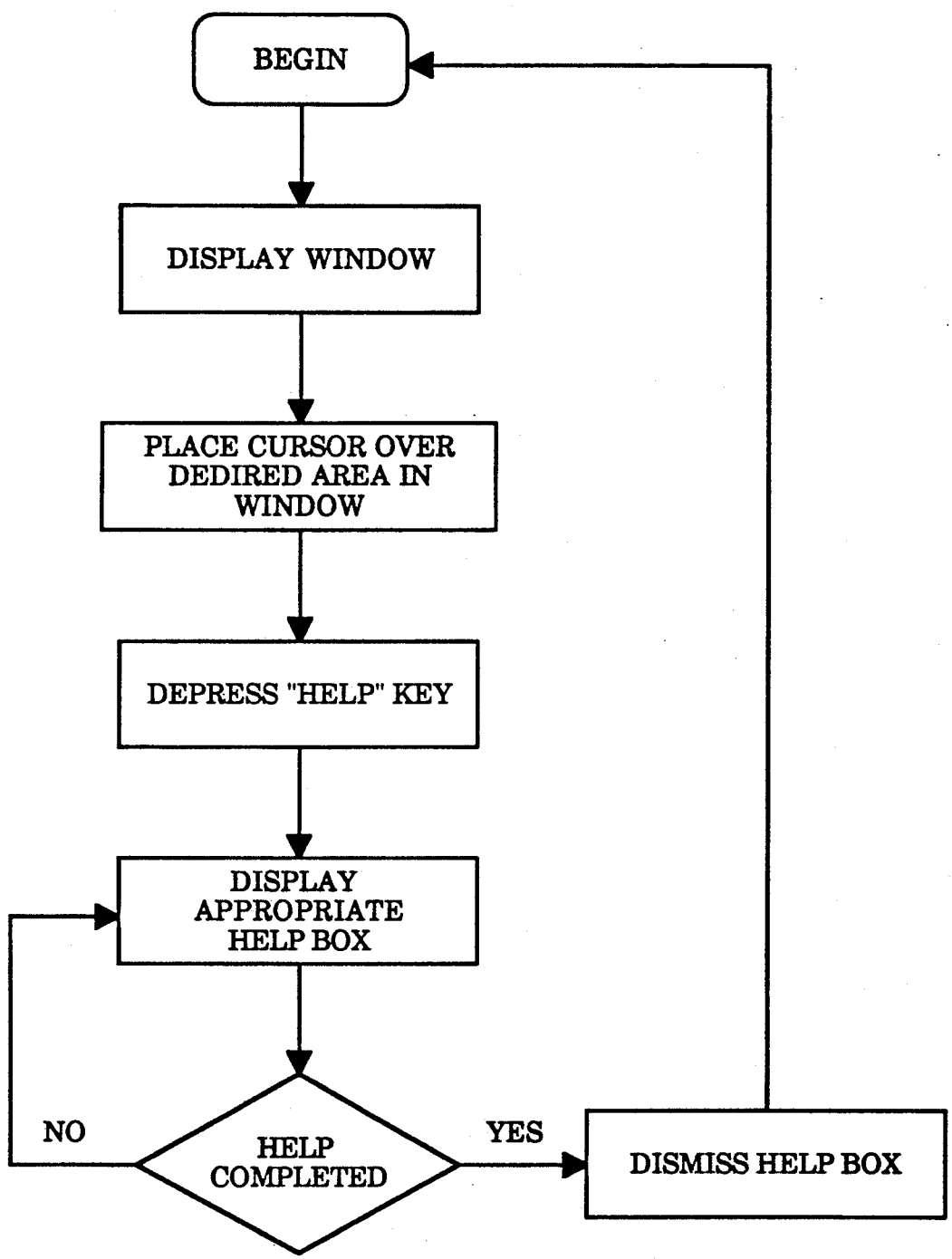
FIG. 5 is a flow chart illustrating the sequence of steps utilized by the present invention to display a context sensitive help window.

Referring now to FIG. 4, the help window which, in the present example, describes push pin 130 is illustrated. As shown, the help window includes the standard elements of a base window, including a title bar 140 and a window mark 145. The help window in the presently preferred embodiment is sufficiently large to display fifty characters and ten lines of help text which is centered vertically within the help window 138. If the help text to be displayed exceeds ten lines, the help window 138 will include a scroll bar and resize corners similar to that illustrated in FIG. 3 for window 80. A "more" button 148 is provided if the particular help description includes additional help text which may be selected by the user in a similar fashion to other buttons within a window of the present invention. In addition, upon the display of help window 138, CPU 14 places cursor 36 over window mark 145. The depression of a key on cursor control device 28 in conjunction with having the cursor 36 over the window mark 145 results in the dismissal of the help window. Upon the dismissal of the help window, such that it is no longer displayed, cursor 36 returns to its last location (in the present example over push pin 130).

In addition to the written text, help window 138 further includes a magnifying glass icon 150 in which is displayed an image of the object which is the subject of the help request. In the example of FIG. 4, an image of push pin 130 is illustrated along with a copy of all pixels comprising window 80 within a predefined radius R from push pin 130. In the presently preferred embodiment, CPU 14 copies pixels within a diameter D which corresponds to the diameter of the magnifying glass icon 150. Thus, the object over which cursor 36 has been placed, along with the area immediately surrounding the object, is copied from the bit map of frame buffer 50 and redisplayed within the magnifying glass icon 150 within the help window 138. Accordingly, in addition to viewing the help text, the user is also provided with an image of the object over which cursor 36 has been placed, which is the subject of the displayed help text. It will be appreciated by one skilled in the art that, unlike prior art help systems, the present invention permits a user to place cursor 36 over any area, icon, or image within a window displayed on display 24 and obtain help information as a function of the location of the cursor 36. Unlike the prior art systems, the present invention does not require the placement or selection of a "?" command to invoke the help documentation. The present invention provides a help system which is sensitive to the context of the image over which cursor 36 has been placed.

Accordingly, the present invention has been disclosed which provides apparatus and methods whereby context sensitive help information may be obtained by a user of a computer display system. While the present invention has been described with reference to FIGS. 1-5, it will be appreciated that the figures are for illustration only and do not limit the spirit and scope of the invention.

It is claimed:

1. In a computer controlled display system having a display coupled to a central processing unit (CPU) for displaying images, a method for displaying help information pertaining to said images displayed, comprising the steps of:
   (a) generating a plurality of images on said display, each image of said plurality of images capable of being invoked to perform an application function;
   (b) positioning a cursor on said display using a cursor control device coupled to said CPU, said cursor being placed over at least a portion of a first image on said display;
   (c) providing a first signal to said CPU by depressing a predetermined help key on a keyboard coupled to said CPU to request help information pertaining to that portion of said first image over which said cursor has been placed;
   (d) generating and displaying a help window on said display, said help window comprising a first area and second area, said first area within said help window including a description of said portion of said first image over which said cursor has been placed, said description being retrieved by said CPU from an entry in a lookup table corresponding to said first image after said CPU identifies said first image based on the location of said cursor on said display, said lookup table having a plurality of descriptions as entries corresponding to said plurality of images on said display;
   copying that portion of said first image disposed within a predetermined radius from said cursor, and displaying said portion of said first image in said second area within said help window;
   (e) providing a second signal to said CPU to dismiss said help window such that said help window is no longer displayed once said description has been read by a user; and
   (f) providing a third signal to said CPU to invoke an application function of said first image if said user desires;
   whereby said help description displayed is a function of the position of said cursor on said display.

2. The method as defined by claim 1, wherein said portion of said first image is displayed in said help window within an image of a magnifying glass.

3. The method as defined by claim 2, wherein said images on said display are disposed within windows.

4. In a computer control display system having a display coupled to a central processing unit (CPU) for displaying images, an apparatus for displaying help information pertaining to said images to a user of said system, comprising:
   first display means coupled to said CPU for generating and displaying said images on said display, each image of said plurality of images capable of being invoked to perform an application function;
   cursor control means coupled to said CPU for selectively positioning a cursor on said display;
   signal generation means coupled to said CPU for providing a first signal to said CPU by depressing a predetermined help key on a keyboard coupled to said CPU to request help information once said cursor has been placed over at least a portion of a first image on said display;
   second display means coupled to said CPU for generating and displaying a help window on said display, said help window comprising a first area and second area, said first area within said help window including a description of said portion of said first image over which said cursor has been placed, said description being retrieved by said CPU from an entry in a lookup table corresponding to said first image after said CPU identifies said first image based on the location of said cursor on said display, said lookup table having a plurality of descriptions as entries corresponding to said plurality of images on said display; said second display means copying that portion of said first image disposed within a predetermined radius from said cursor, and displaying said portion of said first image in said second area within said help window; said signal generation means providing a second signal to said CPU to dismiss said help window such that said help window is no longer displayed once said description is no longer required by said user; and
   said signal generation means providing a third signal to said CPU to invoke an application function of said first image if said user desires;
   whereby said description displayed is a function of the position of said cursor on said display.

5. The apparatus as defined by claim 4, wherein said portion of said first image is displayed within an image of a magnifying glass.

6. The apparatus as defined by claim 5, wherein said images on said display are disposed within windows.

* * * * *